United States Patent [19]

Carmichael

[11] 4,019,597
[45] Apr. 26, 1977

[54] PORTABLE CART-MOUNTED PROPULSION UNIT

[75] Inventor: James W. Carmichael, Clearwater, Fla.

[73] Assignee: Haja, Inc., Coral Gables, Fla.

[22] Filed: Dec. 31, 1975

[21] Appl. No.: 645,830

[52] U.S. Cl. .................................. 180/11; 180/13; 180/19 S

[51] Int. Cl.² ....................................... B62D 51/04

[58] Field of Search ............. 180/19 R, 19 S, 19 H, 180/11, 12, 13, 16; 280/DIG. 5, DIG. 6

[56] References Cited

UNITED STATES PATENTS

| | | | |
|---|---|---|---|
| 2,800,971 | 7/1957 | Lakata | 180/19 R |
| 2,812,824 | 11/1957 | Adams | 180/13 X |
| 3,059,713 | 10/1962 | Beggs | 280/DIG. 5 |
| 3,087,562 | 4/1963 | Harks | 180/11 |
| 3,199,621 | 8/1965 | Seaman | 280/DIG. 5 |
| 3,312,300 | 4/1967 | Jones | 180/19 R |

Primary Examiner—Joseph F. Peters, Jr.
Assistant Examiner—R. Schrecengost
Attorney, Agent, or Firm—Malin & Haley

[57] ABSTRACT

A portable, electric propulsion unit for attachment to a cart or the like including a longitudinal frame member, a battery storage container connected at one end to said frame member, a pair of side frame members connected to said battery storage container and said longitudinal frame member, a wheel mounted between said frame members, an electric motor mounted on one side frame member, a gearing means connecting said motor to said wheel, a connecting bracket rigidly coupled to one wall of said battery storage container and a battery charger connected on a side opposite said motor. The device is readily attachable to a cart, such as a golf bag cart, to provide propulsion of the cart upon command from an electric switch. The device has improved structural rigidity and dynamic balance for increased mobility and reliability.

4 Claims, 9 Drawing Figures

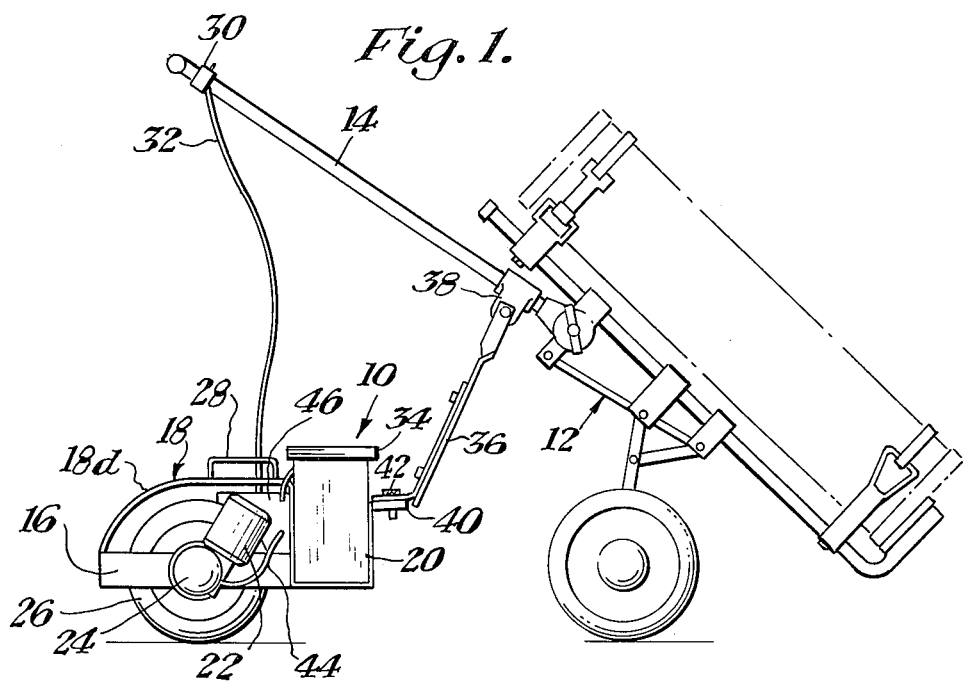
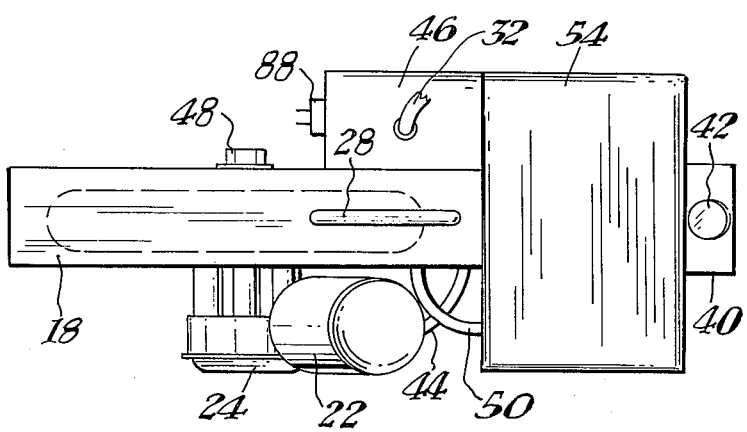
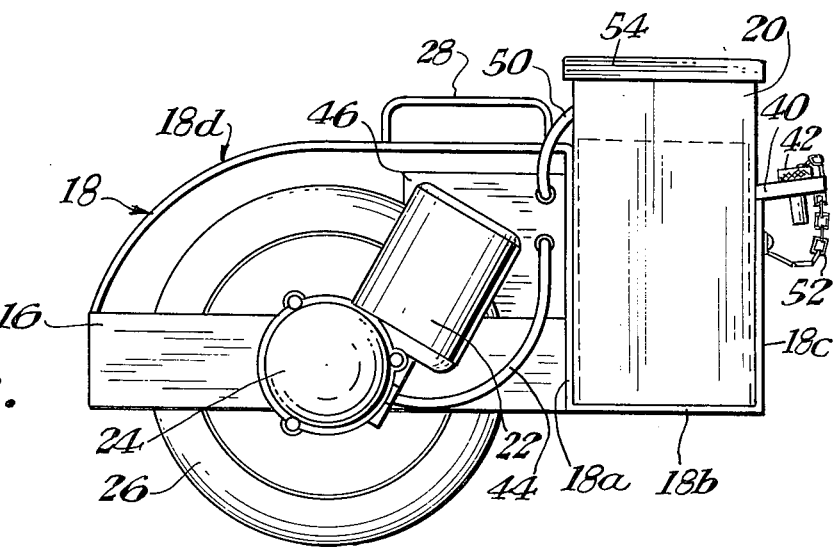

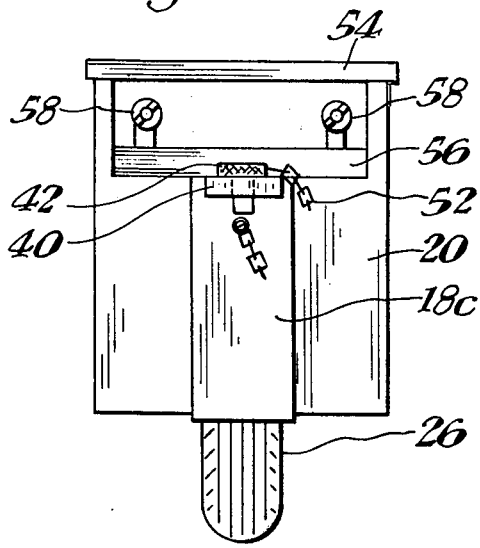
Fig. 4.
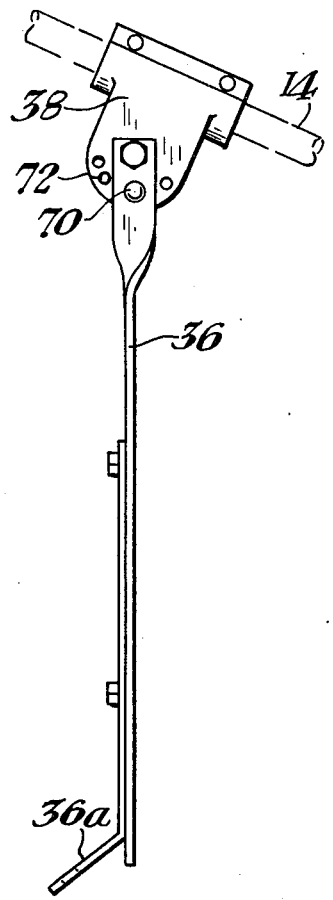
Fig. 7.
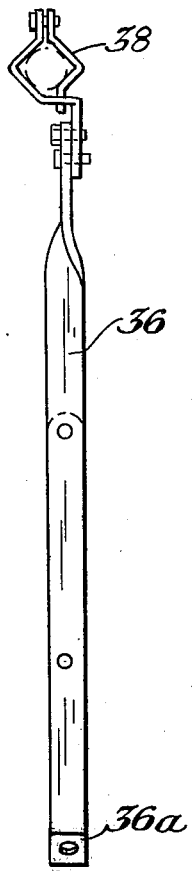
Fig. 8.
Fig. 6.
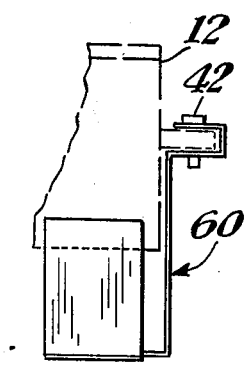
Fig. 5.
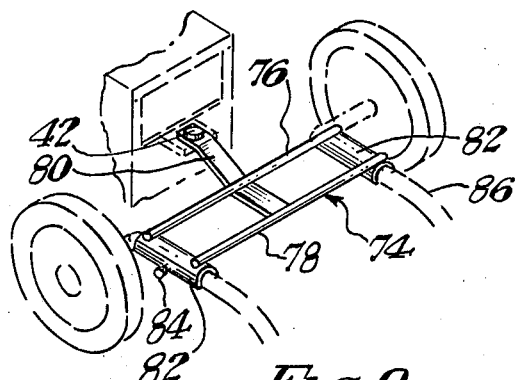
Fig. 9.

PORTABLE CART-MOUNTED PROPULSION UNIT

BACKGROUND OF THE INVENTION

This invention relates generally to an electrically powered propulsion unit which is readily attachable or removeable from a manually motivated wheeled cart, and specifically to a propulsion unit with electrical control and drive which may be utilized with a golf bag-like cart for providing self-sustaining motive power to the cart.

In recent years it has become desirous to provide a motive power means to a conventional manually propelled cart, such as the golf bag carrying type, to reduce human physical exertion in article transportation. Many devices are shown in the prior art which provide propulsion to a manually propelled golf bag cart. The devices shown in the prior art have several deficiencies, not the least of which has been their bulkness which affects mobility. Further limitations include complexity and lack of structural integrity. For example, a golf bag cart is subjected to rough terrain and a propulsion unit attached thereto must be able to perform with mobility but withstand structurally such an environment. But it is is to be portable, it must be lightweight. The devices of the prior art do not solve this paradoxical problem.

The instant invention overcomes the problems of the prior art by providing a non-complex, extremely efficient electrically powered propulsion unit which is readily installable or detachable from a manually propelled cart and specifically to a relatively lightweight, extremely well-balanced propulsion unit readily mounted on a conventional manually powered golf bag cart which has sufficient electrical power and efficiency to operate for relatively long periods of time such as through a complete eighteen hole golf course. The device includes an improved structural frame about which the other elements are balanced including a battery charging device which allows the battery to be recharged when the device is not in use. The device in the instant invention also includes a more efficient electrical switch utilized in conjunction with a motor that is mounted adjacent the wheel to provide gear drive to the wheel eliminating the use of chains or belts, which has been found in the prior art.

BRIEF DESCRIPTION OF THE INVENTION

An electrically powered readily attachable propulsion unit for use in providing motive power to a wheeled article carrying cart. The device includes a longitudinal support frame connected to two side plates with a single wheel being mounted on an axle disposed between the side plates and beneath the supporting frame. A rigid battery storage container is coupled at one end of the support frame such that the side plates are connected to the sides of the battery storage container while the support frame is connected to bottom of the battery storage container. Attached to one wall of the battery storage container is a pivotal connecting bracket for attaching the propulsion unit to a cart such as a golf bag cart. The bracket includes a swivel pin which is received into a flanged arm to allow pivotal motion between the propulsion unit and the cart while still providing a rigid support for the unit. The electric motor and gear box are placed on one side of the wheel while the battery charger is mounted on the opposite side to balance the unit through the wheel plane. The battery and battery storage box is disposed with its center of gravity also in the plane of the wheel. A switch attached to an electrical conduit line may be mounted on the cart handle where convenient to provide for power control of the electric motor.

In one embodiment of the invention an adaptor coupling bracket is included for coupling the instant invention to any of a variety of carts characterized with a vertically disposed shaft. The adaptor bracket includes a pivotal coupling means and an adjustable diameter shaft attaching means with a substantially rigid vertical arm connecting the adjustable shaft attaching means with an arm disposed outwardly for receiving the pin (described above) which pivotally connects the propulsion unit to the cart.

The battery storage box and the battery therein are positioned on the frame at the cart attaching end such that the cart and propulsion unit have the greatest weight at the center of the devices achieving stability for balanced, mobile operation of the unit while providing traction to the single wheel disposed along the center line.

A handle is fixed on the top of the longitudinal frame to allow portability of the unit by hand.

Since the motor is mounted directly adjacent the axle of the wheel on one side and includes a gear drive which is hub mounted, the device eliminates the need for belts and chains found in other units.

The adaptor bracket which is mountable on a vertical shaft includes an upper clamp having an adjustable member to receive cart shafts or varying diameter. The adaptor is also angularly adjustable along its longitudinal axis to accommodate carts with shafts disposed at different angles relative to the cart supporting surface.

It is an object of this invention to provide an attachable, portable, electrical propulsion unit having an improved lightweight, balanced, rigid supporting structure.

It is another object of this invention to provide a cart-attachable propulsion unit for use with a conventional manually propelled cart, the device including a stabilizing connecting bracket for attaching the devices together.

And yet still another object of this invention is to provide a relatively small, lightweight propulsion unit adapted to be attached to a cart for transporting articles, said device having reduced construction costs and improved structural and dynamic characteristics.

In accordance with these and other objects which will be apparent hereinafter, the instant invention will now be described with particular reference to the accompanying drawings.

BRIEF DESCRIPTION OF THE DRAWINGS

FIG. 1 shows a side elevational view of the present invention connected to a conventional golf bag cart.

FIG. 2 is a side elevational view of the present invention and is shown unattached to a cart.

FIG. 3 is a top plan view of the present invention.

FIG. 4 is a front elevational view in the direction of the connecting bracket of the present invention.

FIG. 5 is a side elevational view partially fragmentary showing a stand utilized with the present invention.

FIG. 6 is a perspective view of a stand which may be utilized with the present invention.

FIG. 7 is a side elevational view of a cart connecting adaptor utilized with the present invention for connecting the present invention to a conventional article cart.

FIG. 8 is a front elevational view of the connecting adaptor shown in FIG. 7.

FIG. 9 is a perspective view of an alterate connecting bracket utilizable with the present invention for connecting the present invention to a specific type of golf bag cart.

PREFERRED EMBODIMENT OF THE INVENTION

Referring now to the drawings and specifically to FIG. 1, the present invention is shown generally at 10 connected to a conventional golf bag cart (shown generally at 12) which includes an elongated shaft 14 which in its conventional use serves as a hand grasping cart guide and tilt when maneuvering the golf bag cart 12 manually. The present invention 10 is connected to the conventional cart 12 and to the cart shaft 14 by an elongated adjustable L-shaped adaptor 36 having a lower segment pivotally coupled to connector flange 40 by a removeable swivel pin 42. The upper segment of arm 36 includes a circumferentially adjustable shaft clamp 38 which is receivable about the outer circumference of shaft 14 and is adjustable in diameter to accommodate any of several conventional carts having various sized vertically oriented support shafts.

The present invention includes a pair of rigid side frame members 16 connected to the main propulsion support frame 18, which includes an arcuate shaped upper portion 18d forming a frame for supporting the axle of wheel 26. Connected to one side member 16 is an electric motor 22 and a direct drive transmission 24 connected to the axle of wheel 26. The forward section of the frame 18 has mounted thereupon a rigid battery storage box 20 which is permanently connected to side frame member 16 and a U-shaped segment of frame 18. The storage box 20 houses a battery (not shown in FIG. 1) and includes a rigid cover 34 receivable over the top of the box 20. The cover 30 is pivotally connected to the storage box 20 to allow access to the battery contained therein. Ridigly fixed to the top of frame 18 is a handle for transporting the device 10 by hand.

FIG. 2 shows the present invention including a rigid side member 16 having a parallel counterpart on the opposite side which receives the axle (not shown) of the wheel 26 connected on one side to the transmission 24. The transmission 24 is connected to a high torque electric motor 22 mounted on side plate 16 on the same side of the device. The longitudinal frame 18 is a single unitarily rigid member disposed along the entire length of the unit and includes an arcuate segment 18d near one and a U-shaped segment including sections 18a, 18b and 18c disposed at right angles to each other at the opposite end. The structural frame 18 is symmetrical on each side of the plate of wheel 26 and includes a U-shaped portion at the opposite end which receives and holds the battery storage box 20. Mounted on the opposite side of the device and affixed to the opposite side frame member is a battery recharging device 46. The battery recharger 46 is mounted on the opposite side of the wheel to provide weight balancing to offset the weight of the transmission and motor which are mounted approximately the same distance from a plane passing through the wheel as the battery charger.

FIG. 3 shows the battery charger 46 disposed on one side of the unit with the transmission 24 and motor 22 disposed on the opposite side of the centerline of the tire. This weight distribution insures for improved maneuverability of the unit especially when turning. An electrical connector 32 goes to a switch 30 (shown in FIG. 1) for controlling power to the electrical motor from a battery disposed within the storage box 20.

FIGS. 2 and 3 show the cart connecting flange 40 which is rigidly connected to the frame 18 and disposed adjacent the battery storage box 20 comprised of a rigid flange projecting substantially horizontally which has an aperture for receiving a pin 42 having an attaching chain 50 coupled thereto. The pin 42 and connector 40 are used in conjunction with a cart mounting adaptor described in greater detail below.

FIG. 4 shows the cart attaching end of the device showing a battery 56 having terminals 58 exposed through an aperture in the battery storage box 20. The battery storage box 20 is centered so that the center of gravity is through the plane of wheel 26 to provide for weight equalization on each side of the wheel 26.

FIGS. 5 and 6 shows an attachable stand which may be utilized with the device when it is to be stored or charged and does not have a cart for attachment thereto. The stand 60 includes supporting frame member 64 and a body frame 66, a rigid vertical support plate 68 and a connecting bracket 62 which are adapted to receive the underside of the battery storage box 20 while connecting the attaching bracket with a pin 42 as if it were connected to a cart.

FIG. 7 shows a cart connecting adaptor which is somewhat L-shaped and includes a shaft adjustable attaching bracket 38 which is pivotally connected to the rigid bar 36, the bar including a separate angled metal segment 36A. The pivotal connection of bar 36 to attaching bracket 38 allows for angular adjustment to accommodate cart shaft differences which may be encountered when utilizing the device with for example a golf bag cart. The connecting bracket 38 is shown disposed on a phantom shaft 14 and includes an adjustable diameter attachment portion to accommodate shafts of various diameters. A pin 70 is received in an aperture in bar 36 and within one of a plurality of apertures 72 disposed in the attaching bracket 38 which allow for angular adjustment between a cart shaft and the propulsion unit connector so that the propulsion unit remains level when connected to a cart.

FIG. 8 shows the angular portion 36A which includes an aperture which is utilized with the connector flange 40 (FIG. 1) and pin 42 to provide a pivotal connection between the instant invention and conventional golf bag cart or other article cart having a somewhat vertically oriented supporting shaft. The pin-bracket attachment as shown in FIG. 1 to bracket 40 not only provides a rigid coupling between the propulsion unit and the cart but also allows for ease of installation or removal and detachment of the propulsion unit while still providing complete pivotal freedom between the cart and propulsion unit to allow one to easily turn the device for increased manueverability.

FIG. 9 shows an alternate attaching adaptor 74 which may be utilized with the instant invention which includes a pair of rigid bars 76 and 78 parallely coupled to frame attaching clamps 82 at each end. The clamps 82 include threadable connectors 84 on each side for ridigly clamping the C-shaped clamps 82 to tubular frame members 86 which may be utilized for attachment to a cart device having parallel frame adjacent its wheels. The adaptor includes a tongue portion 80 which includes an aperture for receiving pin 42 which has been discussed above as a connection for the device.

Referring back to FIG. 1, the device is shown attached to a conventional golf bag cart 12 with pin 42 being moveably attached to adaptor 36 which is fixed to the handle 14 of the conventional golf cart bag. An electrical switch 30 which is mounted on the golf bag cart handle 14 includes a multi-positional switch which provides variable power to motor 22 for driving the wheel 26 in two or more modes or speeds or operation. The battery charger includes a plug for connecting into an electrical outlet such as plug 88 shown in FIG. 3. The motor and switch utilized are selected to provide maximum endurance while the transmission direct drive increases endurance such that the vehicle may be utilized for an 18-hole golf course without requiring recharging. The motor and transmission elements and the battery charger along with the battery and battery storage box are positioned on the unitary support frame to provide optimum balancing and center of gravity considerations for increased traction and balance for steering. Efficiency is also achieved by eliminating belts or chain drives. Additional manueverability is achieved by using the removeable pin connector which serves both as a connector and a pivoting joint to allow relative pivotal motion between the cart and the propulsion unit so that it may be easily turned and guided in any desired direction.

Although the device is shown attached to a golf bag cart, the adjustable brackets and the pivotal-type pin mounting along with the center of gravity considerations allow the device to be utilized with any other type of manually propelled cart such as for trash barrels and the like.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A propulsion unit removeably attachable to a conventional manually driven cart comprising:
   a rigid, unitary supporting member, said supporting member including a first arcuate end portion, a middle flat portion, and a second end U-shaped portion, said end U-shaped portion sized to receive a storage battery;
   first and second rigid side plates, each plate attached on opposite sides of said supporting member, one end of each said side plates attached to the arcuate end of said supporting member and the opposite end of each of said side plates attached to said U-shaped end portion;
   a wheel rotatably mounted between and to each of said rigid side plates, said wheel disposed between the first arcuate end portion of said supporting member and the second U-shaped end portion;
   an electric motor mounted on the outside of one of said side rigid plates;
   a gear drive means connected to said wheel and to said motor mounted on the outside of one of said rigid plates, said motor and gear means mounted on the same rigid plate;
   a battery storage container mounted within the U-shaped end supporting member;
   a battery disposed within said battery storage receptacle, said battery lying within the plane of said wheel;
   means for electrically connecting said battery to said motor;
   an electrical switch connected to said means connecting said battery and said motor;
   a horizontally disposed bracket attached to said end U-shaped portion of said supporting member and extended outwardly therefrom, said bracket including a flat plate horizontally disposed having an aperture disposed therein;
   a movable pin receivable within said aperture; and
   a cart shank attaching bracket pivotally coupleable to said horizontally disposed flange and said movable pin.

2. A device as in claim 1 wherein:
   said cart attaching bracket including a shaft adjustable pivotal connector disposed at one end and the L-shaped portion having an aperture disposed at its opposite end, said shaft adjustable pivotal connected including a rigid bar portion pivotally attached to the shaft connector, said bar portion including a means for adjustably fixing the angle between said shaft connector and said bar portion.

3. A propulsion unit as in claim 1 including:
   battery charger connected to said second side plate, on a side opposite said motor, said battery charger including electrical connections to said battery and said motor and a plug for connecting said charger to a conventional electrical outlet.

4. A propulsion unit, as in claim 1, including:
   a detachable stand, said stand including a support frame and a storage receptacle receiving frame rigidly fixed to the supporting frame and a connecting means adapted to and connected to the bracket disposed in said one end of said device.

* * * * *